Nov. 27, 1973  J. AUGE  3,775,522
METHOD FOR THE MANUFACTURE OF SLABS OF EXPANDED FOAM
FREE OF LONGITUDINAL CORRUGATIONS
Filed April 16, 1971                    2 Sheets-Sheet 1
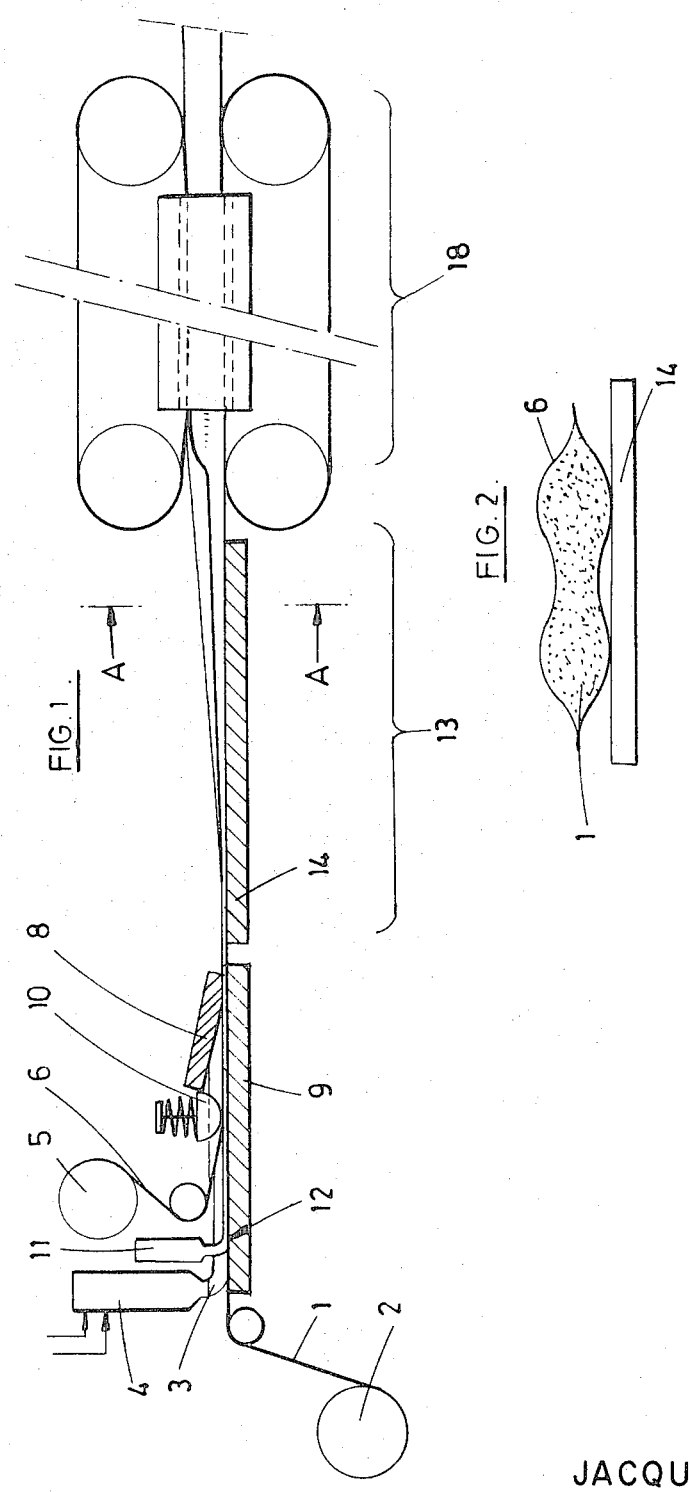
Inventor
JACQUES AUGE
By
Stevens, Davis, Miller & Mosher
Attorneys

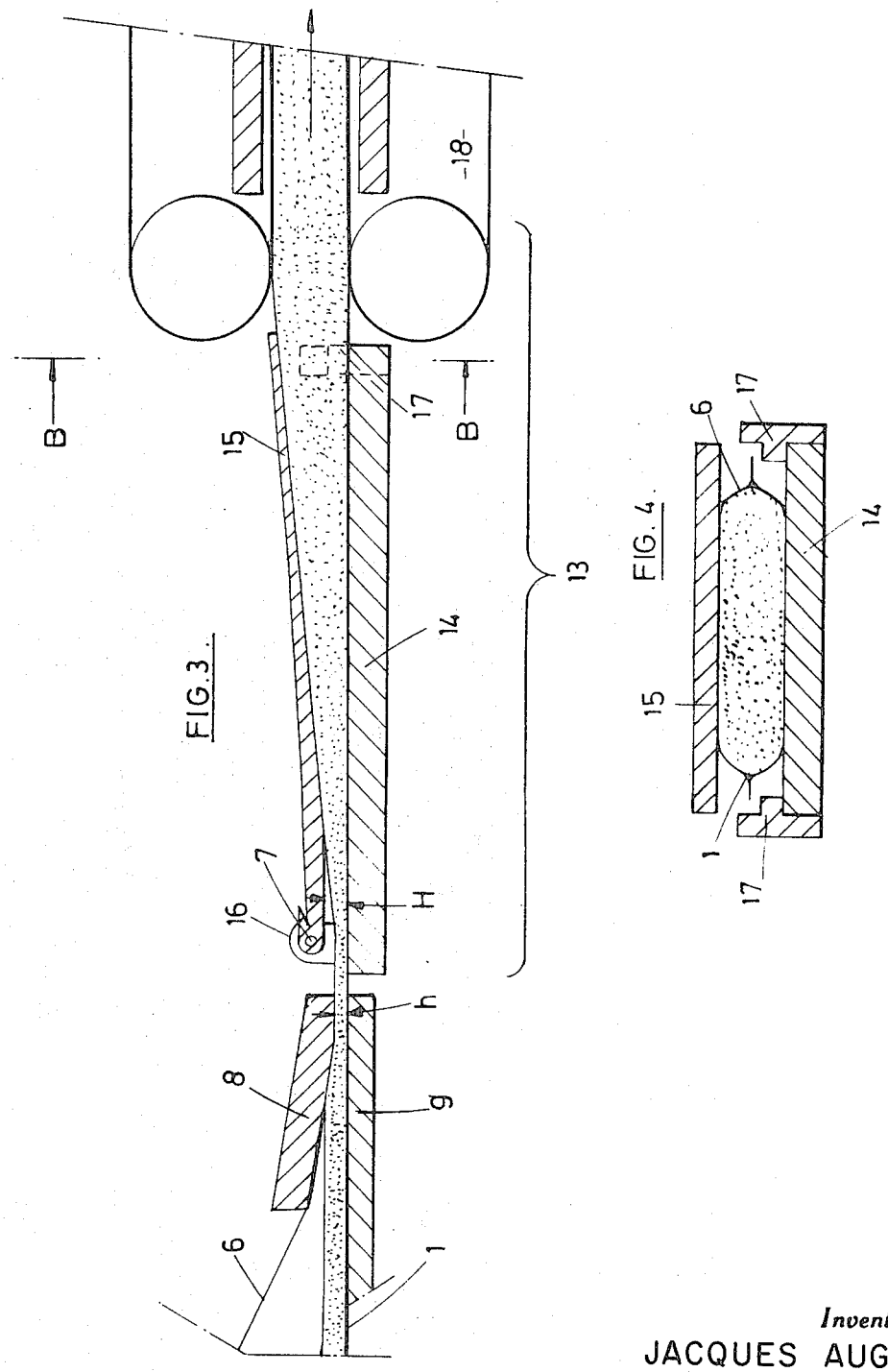

United States Patent Office 3,775,522
Patented Nov. 27, 1973

3,775,522
METHOD FOR THE MANUFACTURE OF SLABS OF EXPANDED FOAM FREE OF LONGITUDINAL CORRUGATIONS
Jacques Auge, Lyons, France, assignor to
Rhone-Poulenc S.A., Paris, France
Filed Apr. 16, 1971, Ser. No. 134,797
Claims priority, application France, Apr. 16, 1970,
13,796
Int. Cl. B29d 27/04
U.S. Cl. 264—47                                    6 Claims

ABSTRACT OF THE DISCLOSURE

A method for the continuous manufacture of slabs of expanded foam in which a foam-forming liquid mixture is spread and calibrated in thickness between two flexible covering sheets. The edges of the covering sheets are simultaneously connected to form a sheath in which the liquid between the sheath is expanded in an expansion zone. A continuous pressure is exerted on the upper surface of the sheath containing the liquid undergoing expansion in a longitudinal portion of between 50 and 95% of the expansion zone, this pressure being sufficient for the upper face to remain, at all times, a regular surface generated by a horizontal generatrix at right angles to the direction of travel of the sheets. Pressure is preferably uniform and may be applied by a longitudinally flexible, transversely rigid pressure member, pivoted at its upstream end and adapted to bear on the upper sheet in the expansion zone.

---

The present invention relates to a method for the manufacture of slabs of expanded foam.

In one method of forming such slabs, the liquid mixture which generates the foam is spread and calibrated in thickness between two covering sheets before expansion of the liquid, and the two longitudinally extending side edges of the sheets are simultaneously joined.

Such a method is, for example, described in French patent specification No. 1,525,046. According to this method, the liquid mixture is cast onto a covering sheet and then covered immediately with a second sheet, and the whole is drawn by means of a transporting and shaping arrangement through a device which spreads the liquid by gradually bringing the sheets together until the liquid reaches a calibrated thickness before expansion. Simultaneously with the spreading of the liquid, the edges of the sheets are combined to form a leakproof sheath.

In certain cases, especially in the manufacture of slabs of large widths and large thicknesses having thin and flexible covering sheets, a tendency to form substantially longitudinal corrugations in the covering sheets is frequently observed in the expansion zone. These corrugations tend to displace laterally the foam during expansion, which changes the distribution of the foam forming liquid mixture, which had been strictly uniform when it issued from the spreading device. Passage through the conveyor which draws the assembly through the expansion in fact causes these corrugations to disappear, but at the cost of a rearrangement of the foam in the last stage of the expansion, that is to say to the detriment of its uniformity and its mechanical properties, and at times with partial destruction of the cellular structure and liberation of gas.

Regardless of the precautions taken or the adjustments made, one can only reduce the danger of appearance of this phenomenon or diminish its extent, but its certain elimination is not achieved, especially in the manufacture of slabs of large widths and large thicknesses which are covered with thin and flexible sheets. The aim of the present invention is to eliminate the longitudinal corrugations which can arise in the manufacture of slabs of expanded material.

According to the present invention there is provided a method for the continuous manufacture of slabs of expanded foam comprising spreading and calibrating in thickness a foam forming liquid mixture between two flexible covering sheets, the edges of which are simultaneously connected to form a sheath, expanding liquid within the sheath in an expansion zone and exerting a continuous pressure on the upper face of the sheath containing the liquid undergoing the expansion, in a longitudinal portion of between 50 and 95% of the expansion zone, this pressure being sufficient for the upper surface to remain, at all times, a regular surface generated by horizontal generatrices that run at right angles to the direction of travel of the sheets.

The invention also provides apparatus for the continuous manufacture of slabs of expanded foam comprising a substantially horizontal table, means for feeding a first flexible covering sheet over said table, means for feeding liquid to be expanded onto said covering sheet, means for feeding adhesive to the longitudinal edges of said covering sheet, means for feeding a second covering sheet onto said first covering sheet, means for calibrating the thickness of the two sheets and the interposed liquid, an expansion zone for the expansion of the liquid together with the sheets, means for withdrawing the expanded foam between the sheets and a transversely rigid pressure member adapted to bear on the upper surface of the upper covering sheet, and having a lower face formed by a horizontal generatrix at right angles to the direction of travel of the sheets. Advantageously the pressure member is longitudinally flexible.

Using the method and apparatus of the present invention it is possible to keep the upper and lower faces of the sheath formed by the sheets surrounding the liquid which generates the foam during expansion, along regular surfaces which can be generated by horizontal generatrices at right angles to the direction of travel of the covering sheets.

The present invention also relates to the products obtained by using the above method and apparatus.

The invention will be better understood from the following description, which is given merely by way of example, reference being made to the accompanying drawings, in which:

FIG. 1 is a schematic side elevation, partly in section of a machine of a known type for the continuous manufacture of slabs of expanded foam;

FIG. 2 is a transverse section taken along the line AA, of FIG. 1 of a portion of the sheath containing the product undergoing expansion;

FIG. 3 is a sectional side elevation, similar to FIG. 1, but to an enlarged scale of the expansion zone of an apparatus similar to that shown in FIG. 1, but modified to include the improvements according to the invention; and FIG. 4 is a transverse section taken along the line BB of FIG. 3.

In the present text, the terms "liquid reactant mixture" or "liqud mixture which generates the foam" or quite simply "liquid mixture" are to be understood to include any customary liquid mixture which constitutes a composition which generates a rigid, semi-rigid or flexible foam by reaction of its components. For example, the terms include the mixtures based on polyethers or polyesters possessing hydroxyl groups and on a polyisocyanate, water, blowing agents, surface-active agents and catalysts, such as those employed for the preparation of slabs of rigid, semi-rigid or flexible polyurethane foam.

In the apparatus shown in FIG. 1, a covering sheet 1 is unrolled horizontally from a drum 2, and a liquid reactant mixture 3 is cast onto this sheet from a casting head 4. The liquid deposited is immediately covered by a second covering sheet 6 from a roll 5, the sheets 1 and 6 being drawn at the same speed through an arrangement consisting of two fixed convergent surfaces 8 and 9, for the gradual and continuous spreading of the liquid mixture between the sheets and for the thickness calibration of this liquid. Simultaneously, the edges of the sheets 1 and 6 are joined in a leakproof manner by depositing two thin streaks 12 of a very rapidly-setting adhesive from dispensers 11, the sheet 6 being pressed onto these streaks by means of spring loaded pressure pads 10. A leakproof sheath is thus formed, which contains a uniformly distributed liquid film of calibrated thickness. This sheath then passes into the expansion zone 13 for the liquid reactant mixture, with the sheet 1 sliding over a fixed horizontal table 14. The sheath is driven, and shaped to the desired thickness, by a shaping conveyor 18, inside which the expansion is completed.

When employing such a machine under certain conditions, especially in the case of the manufacture of slabs of large widths and large thicknesses, covered with thin and flexible sheets, corrugations in the covering sheets 1 and 6 can be observed in the expansion zone. The transverse section of the sheath, is shown in FIG. 2, and it can be seen that the deformation of the upper sheet generally brings about a similar, but less marked, deformation of the lower sheet.

According to the invention, it has been found that these corrugations can be eliminated entirely if, in a longitudinal portion of between 50 and 95% of the expansion zone, a continuous pressure is applied to the upper face of the sheath which is undergoing expansion, the pressure being sufficient for this face to remain at all times a regular surface generated by horizontal generatrices at right angles to the direction of travel of the sheets.

By expansion zone is meant the zone between the surfaces 8 and 9 where the thickness of the uniformly spread liquid is calibrated and the limit where the slab achieves its definitive thickness inside the conveyor-shaper 18. The expansion is generally complete at the inlet to the conveyor-shaper (compare FIGS. 1 and 3), which allows its possibilities to be utilised to the maximum extent.

The pressure to be exerted on the sheath must be sufficient for the upper face of the sheath undergoing expansion to remain at all times a surface as defined above but, nevertheless, it must not be too high, so as not to interfere with the expansion of the foam or risk causing the whole of the liquid undergoing expansion to flow.

The choice of the optimum pressure depends on numerous factors, and very especially on the nature of the liquid undergoing expansion and on the flexibility of the sheets forming the sheath.

It is adjusted experimentally to the value which is just sufficient for the deformations of the sheath not to occur.

A continuous pressure can be exerted by various means on the upper face of the sheath undergoing expansion. One of these means, which constitutes a preferred embodiment, has been represented in FIG. 3. It comprises, above the fixed horizontal table 14, a plate 15 which is flexible longitudinally and rigid transversely. The width of this plate is at least equal to the width of the covering sheets 1 and 6; its length is generally between 50% and 95% of the length of the expansion zone. The front edge of the plate is held by means of an axle 7 which can pivot freely inside two support bearings 16 arranged on either side of the table 14 and attached thereto. The free thickness H between the front edge of the plate 15 and the table 14 is generally between 1 and 5 times the free thickness $h$ between the tables 8 and 9 of the spreading and calibrating device. It is preferably between 1.1 tand 2.5 times this thickness. The rear edge of the plate 15 is free and when at rest, rests either directly on the table 14 or preferably on lateral blocks 17, parallel with the table 14.

In use, initially the convering sheets 1 and 6 are introduced between the table 14 and the plate 15. The liquid reactant mixture enters the expansion zone after having been uniformly spread and calibrated to a definite thickness $h$. The expansion starts slowly and the reactant mixture preferably simultaneously lifts the upper sheet 6 and the plate 15, but it can alternatively lift them in succession. Thereafter, the expansion takes place more rapidly, the pressure generated by the expanding foam balances the weight of the plate 15, and the latter rises progressively further. As the reactant mixture is uniformly spread before expansion, the expansion takes place vertically in a uniform manner. Thus the plate 15, which is transversely rigid and which rests on the product undergoing expansion, retains a regular lower surface generated by the horizontal generatrices at right angles to the direction of travel of the sheets. FIG. 4 shows the action of the plate 15 on a transverse section of the sheath, and it will be seen that the corrugation of the upper sheet and, through counter-action, those of the lower sheet have disappeared. Furthermore, the glued edges of the sheets 1 and 6 rise gradually and come together very slightly.

The expansion is gradually completed and due to its longitudinal flexiblity the plate 15 continuously and uniformly covers the sheet 6 over the major part of the expansion zone, matching the longitudinal profile of this expansion zone without significantly modifying it.

The plate 15 thus exerts a continuous pressure, through its intrinsic weight, on the product undergoing expansion. It has proved particularly advantageous for the plate 15 to be flexible longitudinally. For the manufacture of polyurethane foam slabs covered with thin sheets, a rectangular metal plate is generally employed which is between 2 and 5 times as long as it is wide, and of which the thickness varies, in the case of aluminum, between 0.2 and 5 mm. and preferably between 0.5 and 3 mm. It is obviously valuable that the lower face of the plate should be smooth and should display a polished appearance or should be covered with a coating which favours slip.

Other metals than aluminium can be employed and their thickness will be so chosen as to have a unit weight of the order of that of an aluminium plate such as has been mentioned above.

It is possible to use a plate consisting of the combination of a lower sheet of a thermoplastic, such as polyethylene, and an upper metal sheet. However, generally a homogeneous plate is employed, made of a metal or alloy which is a good conductor of heat, such as copper, aluminium and the like, and such a plate makes it possible to easily supply or remove heat in the expansion zone.

If desired the plate 15 can be combined with any means of heat exchange which may be necessary, such as, for example, circulating coils for heating fluids or cooling fluids, electrical resistances and the like.

The plate 15 can also be formed of slats or of transverse plates of narrow widths, connected to one another in a flexible manner, for example by a system of hinges. If the slats are of the same weight, such a plate 15 can exert a continuous uniform pressure over the greater part of the expansion zone.

The plate 15 can also, where necessary, be subjected to additional loads distributed locally so as to assist the continuous contact of the plate with the sheath, but the plate should retain its longitudinal flexibility.

The transverse rigidity of the plate can also be improved by transverse ribs.

Many other embodiments will suggest themselves to a technician, and the process can be carried out with any device which possesses a regular surface with horizontal generatrices at right angles to the direction of travel and providing a slight pressure on the product undergoing expansion. The value of this pressure can easily be adjusted experimentally, but by way of example a pressure of the order of 0.5 to 10 grams/cm.$^2$ and preferably between 0.6 and 2 grams/cm.$^2$ very generally proves satisfactory with the customary compositions for the production of polyurethane foams.

This process provides a considerable technical advance. In effect, through eliminating the risk of corrugations forming in the covering sheets, it allows the uniform distribution of the product to be preserved in the expansion zone until polymerization has occurred. It thus allows homogeneous slabs of expanded foam to be obtained, regardless of their width, their thickness and the nature of the covering sheets.

I claim:

1. In a process for the preparation of slabs of expanded polyurethane foam by a process wherein a liquid foamable mixture which reacts to form a polyurethane foam is applied to a surface of an advancing first continuous sheet leaving a margin adjacent each longitudinal edge thereof, an adhesive is applied to the margins and a second flexible continuous covering sheet is advanced along with the first sheet and is joined thereto along the said margins to form a sandwich with closed longitudinal edges, passing the sandwich through a spreading zone where the liquid foamable mixture is spread to a preset thickness and advancing the sandwich through a zone where the foamable mixture reacts and expands into a polyurethane foam, the improvement comprising eliminating longitudinal corrugations by continuously pressing the sandwich across its entire width and from 50 to 95% of the length thereof extending from the spreading zone through the expansion zone by means of a longitudinally flexible and transversely rigid pressure member having the weight per unit area of an aluminum plate of a thickness between 0.2 and 5 millimeters, said pressure member having a horizontal generatrix at right angles to the direction of travel of the sheets.

2. The process of claim 1 wherein said pressure member comprises platens flexibly connected to one another.

3. The process of claim 1 wherein said pressure member comprises a platen which is pivotally mounted at its upstream edge.

4. A method as claimed in claim 1, in which the continuous pressure is uniform.

5. A method as defined in claim 1, in which the pressure is caused by means matching the horizontal profile of the expansion zone without significantly modifying it.

6. A method as defined in claim 1, in which the pressure is exerted from a point of the expansion zone where the thickness of the liquid reactant mixture is between 1 and 5 times that of said calibrated reactant mixture.

References Cited

UNITED STATES PATENTS

| 3,354,503 | 11/1967 | Joseph et al. | 18—4 |
|---|---|---|---|
| 2,956,310 | 10/1960 | Roop et al. | 264—54 |
| 3,240,846 | 3/1966 | Voelker | 264—47 |
| 3,553,300 | 1/1971 | Buff | 264—48 X |
| 2,873,481 | 2/1959 | Semegen | 264—48 |
| 2,009,984 | 7/1935 | Billner | 264—48 X |
| 3,443,007 | 5/1969 | Hardy | 264—54 X |
| 3,417,168 | 12/1968 | Keith | 264—45 X |
| 3,530,029 | 9/1970 | Lemelson | 264—47 X |
| 3,617,594 | 11/1971 | Willy | 264—47 X |
| 3,644,606 | 2/1972 | Auge | 264—47 |
| 3,647,588 | 3/1972 | Greig | 264—47 X |

FOREIGN PATENTS 1,525,046   4/1968   France.

PHILIP E. ANDERSON, Primary Examiner

U.S. Cl. X.R.

156—79; 161—139, 149, 161; 264—54, 331; 425—4 C